No. 712,745. Patented Nov. 4, 1902.
S. W. WARDWELL.
LUBRICATING DEVICE.
(Application filed Oct. 2, 1901.)
(No Model.)
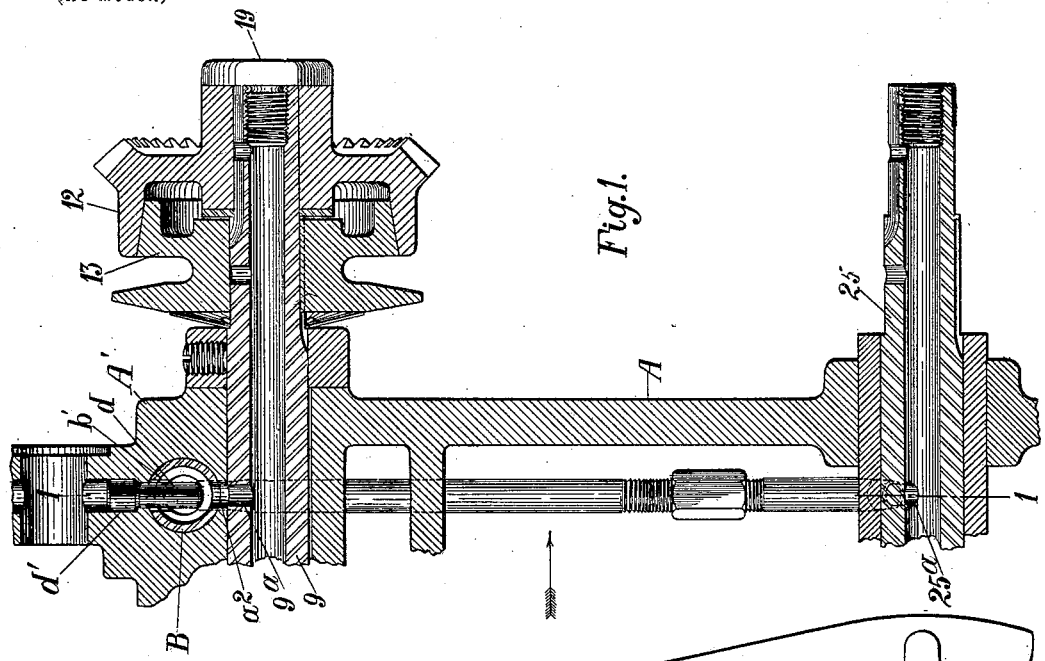
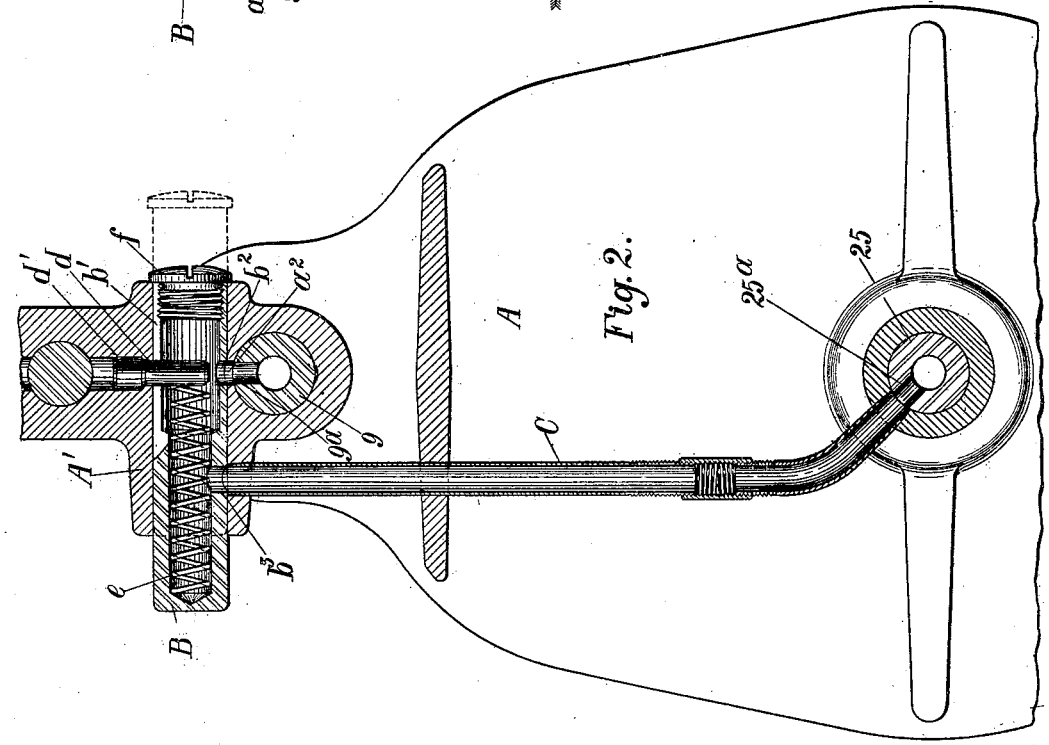
WITNESSES
INVENTOR
Simon W. Wardwell
BY
ATTORNEYS

UNITED STATES PATENT OFFICE.

SIMON WILLARD WARDWELL, OF PROVIDENCE, RHODE ISLAND, ASSIGNOR TO UNIVERSAL WINDING COMPANY, OF PORTLAND, MAINE, A CORPORATION OF MAINE.

LUBRICATING DEVICE.

SPECIFICATION forming part of Letters Patent No. 712,745, dated November 4, 1902.

Application filed October 2, 1901. Serial No. 77,333. (No model.)

*To all whom it may concern:*

Be it known that I, SIMON WILLARD WARDWELL, a citizen of the United States, residing at Providence, in the county of Providence and State of Rhode Island, have invented certain new and useful Improvements in Lubricating Devices, of which the following is a specification.

My invention relates to improvements in lubricating devices, and comprises an oil-reservoir and automatic means whereby to properly and adequately distribute the oil to the different parts of a system in such manner that while each bearing receives sufficient oil there is no waste thereof.

In the accompanying drawings, which illustrate my invention, Figure 1 is a sectional view of a portion of a machine, taken longitudinally of the shafts, showing the latter, their bearings, and my improved devices applied thereto; and Fig. 2 is a transverse section of the same on the line 1 1, Fig. 1, looking in the direction of the arrow.

I have preferably shown my invention as applied to a machine in which lubrication must be conducted to members which rotate on the shafts, as well as to the bearings in which the shafts themselves rotate.

Two shafts 9 and 25 rotate in bearings in the main frame A of the machine. Each is adapted to be driven from a continuously-rotating wheel 12 through a clutch 13, which serves to engage its shaft with the wheel 12 when the shaft is rotating or to disengage it therefrom when the shaft is stopped. It is therefore necessary to maintain the lubrication of the wheel 12 when rotating on the stopped shaft, as well as of the clutch 13, that the latter may slide freely on the shaft. For clearness the wheel 12 and the clutch 13 are not shown in place on the lower shaft 25, and the devices for effecting the engagement and disengagement of the clutch and its wheel have been entirely omitted, as they are not material to my invention. In the machine illustrated its frame constitutes a part of the reservoir, being appropriately formed to serve as a casing therefor. The portion A' of the frame A immediately above the upper shaft 9 is bored transversely of the shaft to receive a sliding oil-receiver B. The latter is provided with an opening $b'$ for the introduction of oil and ports $b^2$ and $b^3$, through which the oil is delivered to ducts, as C and $a^2$, and thence through suitable channels to the bearings. To insure that the two ports shall register with the openings to their corresponding ducts, the oil-receiver is prevented from turning in its casing by the pin $d$, which is carried in said casing and extends into the elongated opening $b'$, cut through the shell of the oil-receiver and through which the oil is introduced. This slot is made sufficiently long to permit a longitudinal movement of the oil-receiver to the position indicated by the dotted lines for the introduction of oil. The spring $e$, interposed between the pin $d$ and one end of the oil-receiver, forces the latter to the position indicated by the full lines to close the opening $b'$ and maintain it closed. The cap $f$, screwed into the end of the oil-receiver for a closure, limits the movement of the latter under the action of the spring $e$. That the pin $d$ may not be driven so far through the casing of the reservoir as to interfere with the movement of the oil-receiver or close the port which is directly beneath the pin, the latter is made with a head $d'$, which bottoms in the hole in which it is fitted to the casing. The pin $d$ also serves to limit the movement of the oil-receiver in one direction.

Registering with the ports $b^2$ and $b^3$ when the oil-receiver B is in its normal position are the duct $a^2$, leading to the bearings of the upper shaft 9, and the duct or pipe C, leading to the bearings of the lower shaft. In the machine illustrated the pipe C, which leads from the reservoir to the lower shaft, is of such greater volume than the ducts leading to the upper shaft that means must obviously be provided to prevent the delivery to the pipe C of all the oil introduced into the oil-receiver B. If this should occur, one bearing would have for reserve lubrication all the oil retained in the pipe C and its connections, while the other shaft would have only the inadequate quantity retained in the short duct $a^2$ and its connections. To meet this condition, the oil-receiver B is made with chambers of different volumes, the smaller of which communicate with the longer ducts and connections. The outlets from these chambers are at different levels, so when the oil has ceased to flow to the larger set of ducts there still remains a sufficient quantity in the reservoir to supply the other ducts for an extended period. The shafts are both formed with axial bores, from which lead radial ports $9^a$ and $25^a$, so located as to intermittently register during the rotation of the shafts with the openings of the ducts $a^2$ and of the pipe C. The oil is thus admitted to the central bores of the shafts, through which it is distributed to the different bearings. Radial ducts lead from the central bore of each shaft to the shaft-bearings and to the bearings of the clutch 13 and of the clutch-wheel 12 on the shafts, through which oil is forced by centrifugal action. As the radial ports in the shafts are not in continuous communication with their ducts, but register therewith only intermittently, the appropriate quantity of oil is fed to the bearings to maintain lubrication without excess or waste. The opening of the bore at the end of each shaft is closed by suitable means, in this instance by a screw-plug 19, whose head serves to retain the clutch-wheel 12 in place on its shaft.

The reservoir is filled by sliding the oil-receiver B into the position indicated by the dotted lines in Fig. 2, where it closes the openings to the oil-ducts $a^2$ and C. When filled, the oil-receiver is returned by the spring $e$ to its normal position, thus opening the oil-ducts and permitting the oil to flow to the various bearings.

Unless some means be provided for gaging the amount of oil introduced into the reservoir waste both of time and of oil as well would occur and there will result lack of uniformity in the amount of oil introduced. The amount of oil that may be contained in the oil-reservoir B is ample to supply the machine-bearings for an indefinite period, and therefore serves as a gage or measure of the quantity of oil to be employed. The machine attendant has but one thing to remember when oiling the machine—to open the receiver and fill it. That is all. He need exercise no judgment as to the number of drops to be applied to different bearings. There is but one point at which to introduce oil, and at this point the only precaution to be exercised is to fill the receptacle provided.

My invention is described as applied to a certain type of machine and to a certain arrangement and relation of bearings; but it is obviously not limited to the precise manner of application described. The oil-reservoir is susceptible of application to single bearings as well as to a plurality of bearings. The casing for the reservoir need not be formed in a machine-frame, but may be entirely separate therefrom, to be attached by any suitable means.

Without limiting myself to the precise form of structure described, I claim—

1. The combination with a plurality of shafts having axial chambers and radial ports, and shaft-bearings, of a single oil-reservoir above said bearings, and ducts leading from the reservoir to such shafts, and means for automatically supplying oil in graduated quantities to said ducts substantially as described.

2. In a lubricating device, the combination with a plurality of shafts having axial bores therein and radial outlets therefrom to the bearings of the shafts, of a single oil-reservoir to receive oil for distribution to the different bearings, having ports through which the oil is discharged, and ducts that distribute the oil from said ports to the various shafts, and means whereby the reservoir-ports are closed by opening the reservoir for the introduction of oil, and opened by the closing of the said reservoir, substantially as described.

3. In an oiling device, an oil-reservoir with an oil-receiver movable therein, having an inlet normally covered by the casing of the reservoir, and arranged to be uncovered by moving said receiver, and outlet-ports arranged to be opened when the inlet is closed, and to be closed when the inlet is opened, shafts having axial chambers with ports communicating with the various shaft-bearings and having also inlet-ports to receive the oil from the reservoir, and ducts leading from the reservoir-ports to the supply-ports of the different shafts, substantially as described.

4. The combination with a plurality of shafts having bearings in a machine-frame A, of an oil-reservoir located above said bearings, ducts leading from the reservoir to the bearings, means for opening the reservoir for the introduction of oil and whereby the ducts are at the same time closed, and means for automatically closing the reservoir to the introduction of oil and opening the oil-ducts, substantially in the manner described.

5. In an oil-reservoir, a casing A' having a bore $a$ and ducts leading therefrom, an oil-receiver B movably mounted in said bore, having an inlet for the reception of oil and outlet-ports registering with the ducts, substantially as described.

6. In an oil-reservoir, a casing, an oil-receiver movable in the casing having chambers of different volume, and ducts leading from the various chambers, in the manner and for the purpose substantially as described.

7. In an oil-reservoir, a casing, an oil-receiver longitudinally movable in the casing having an inlet for the introduction of oil, and chambers of different volume, ducts leading from the reservoir to different bearings, the casing having ports to connect the chambers with the ducts, adapted to be closed while the inlet is open to fill the reservoir, and open when the inlet is closed, in the manner and for the purpose substantially as described.

8. In an oiling device, the combination with a reservoir, of a movable oil-receiver forming part of the reservoir, oil-ducts leading from the reservoir to bearings, outlet-ports in the oil-receiver to register with the ducts, and an inlet to the receiver for the introduction of oil, substantially as described.

9. In an oil-reservoir, casing A' having a bore $a$ and ducts leading therefrom, an oil-receiver movably mounted in said casing having an aperture for the introduction of oil, and outlet-ports through which the oil is delivered to the bearings, and means to insure the alinement of the ports with the ducts, substantially as described.

10. In an oil-reservoir, a casing A', a cylindrical oil-receiver B adapted to be moved longitudinally in the casing and having an elongated opening $b'$ and outlet-ports $b^2$ and $b^3$, a pin $d$ entering said elongated opening to prevent the rotation of the receiver B, a spring $e$ between the end of the receiver and the pin $d$ to move the receiver B in its casing, and a cap $f$ to close the end of the receiver and limit its movement under the action of the spring $e$, substantially as described.

11. In an oil-reservoir, a casing, an oil-receiver movable in the casing having an inlet for the introduction of oil and outlet-ports to deliver the oil from the reservoir, so located that when the receiver is moved to open the inlet, the outlet-ports are closed, and when the inlet-port is closed, the outlet-ports are open, substantially as described.

12. The combination with the bearings of one or more rotary shafts, of a cylindrical oil-receiver adapted to slide longitudinally in a casing above the shafts, having ports adapted to normally register with oil-ducts leading to the bearings of the shafts, an elongated inlet in the top of said receiver, means whereby pressure on one end of the receiver will force the latter longitudinally in its bearing to close the ports and expose the inlet, a pin projecting from the casing into the inlet to prevent the rotation of the receiver and adapted to engage the end of the inlet to limit the movement of the receiver in one direction, a spring between the pin and the end of the receiver to return the latter to its normal position to close the inlet and open the ports, and a cap to close the end of the receiver and limit its movement under the action of the spring, substantially as described.

In testimony whereof I have signed my name to this specification in the presence of two subscribing witnesses.

WILLIAM WILLARD WARDWELL.

Witnesses:
CHARLES A. EDDY,
JOSHUA B. HALE.

Correction in Letters Patent No. 712,745.

It is hereby certified that in Letters Patent No. 712,745, granted November 4, 1902, upon the application of Simon Willard Wardwell, of Providence, Rhode Island, for an improvement in "Lubricating Devices," an error appears in the printed specification requiring correction, as follows: On page 3, at the end of the specification, the name of the applicant was erroneously printed "William Willard Wardwell," instead of *Simon Willard Wardwell;* and that the said Letters Patent should be read with this correction therein that the same may conform to the record of the case in the Patent Office.

Signed and sealed this 18th day of November, A. D., 1902.

[SEAL.]

F. I. ALLEN,
*Commissioner of Patents.*